United States Patent
Westmacott et al.

(10) Patent No.: US 10,701,321 B2
(45) Date of Patent: Jun. 30, 2020

(54) SYSTEM AND METHOD FOR DISTRIBUTED VIDEO ANALYSIS

(71) Applicant: Sensormatic Electronics, LLC, Boca Raton, FL (US)

(72) Inventors: Ian Christopher Westmacott, Tewksbury, MA (US); Steve Carney, Foxborough, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 106 days.

(21) Appl. No.: 14/634,428

(22) Filed: Feb. 27, 2015

(65) Prior Publication Data

US 2016/0253883 A1 Sep. 1, 2016

(51) Int. Cl.
*H04N 7/18* (2006.01)

(52) U.S. Cl.
CPC .................... *H04N 7/181* (2013.01)

(58) Field of Classification Search
CPC ..................................... H04N 7/181
See application file for complete search history.

(56) References Cited

U.S. PATENT DOCUMENTS

| | | |
|---|---|---|
| 7,257,273 B2 | 8/2007 | Li et al. |
| 8,824,750 B2 | 9/2014 | Jankowski et al. |
| 10,108,157 B1 * | 10/2018 | Raghavan .......... G06K 9/00771 |
| 2010/0002070 A1 * | 1/2010 | Ahiska .............. G08B 13/19691 348/36 |
| 2011/0080495 A1 * | 4/2011 | Busse .................. G06K 9/3233 348/222.1 |
| 2012/0140067 A1 * | 6/2012 | Crossen ............... H04N 7/0125 348/143 |
| 2014/0044348 A1 * | 2/2014 | Chen .................. G06K 9/00221 382/159 |
| 2014/0282934 A1 * | 9/2014 | Miasnik ................. H04L 63/08 726/5 |
| 2014/0333776 A1 * | 11/2014 | Dedeoglu ............. H04N 7/181 348/159 |

* cited by examiner

*Primary Examiner* — Richard T Torrente
(74) *Attorney, Agent, or Firm* — HoustonHogle LLP (57) ABSTRACT

A system and method for distributed analysis of image data in a video surveillance system can be deployed in households, businesses, and within corporate entities, in examples. The image data are processed on local video analytics systems located within the networks of the businesses or on remote video analytics systems hosted by a cloud service. To limit the data traffic imposed by the image data on the network, the system divides the image data processing into separate object detection and analysis functions. The system can also integrate the object detection function within the surveillance cameras or on a local gateway. This can significantly reduce the data traffic sent over networks as compared to current video surveillance systems and methods since only image data containing object of interest needs to be sent.

23 Claims, 7 Drawing Sheets

SYSTEM AND METHOD FOR DISTRIBUTED VIDEO ANALYSIS

BACKGROUND OF THE INVENTION

Video surveillance systems are increasingly deployed within public and private institutions, such as households, commercial buildings, businesses, retail establishments, schools, hospitals and government buildings, to list a few examples. These surveillance systems are often used for a number of different tasks, such as intelligence gathering by governments and businesses, prevention or investigation of crime by law enforcement or retail establishments, and monitoring the usage of resources or structures such as buildings, bridges or roads, to list a few examples.

A number of components are common to many of these video surveillance systems. Surveillance cameras capture image data that are typically then sent over one or more data networks, such as governmental, service provider, enterprise or home networks. This image data are typically stored on network video recorders (NVRs). Video analytics systems are often included to analyze the image data. Finally, control systems are often used to control the surveillance systems and coordinate the operation of the components.

These video analytics systems have the capability of automatically analyzing image data to detect and determine temporal and spatial events. Minimally, these systems track objects against fixed background scenes. More sophisticated functions include object detection to determine the presence of an object or a type of object. Even higher level functions include object analysis, such as object identification.

The methods employed by video analytics systems for detecting and analyzing classes of objects in image data have become more accurate in recent years, and are, as a consequence, becoming more and more important in video surveillance systems. Two common examples of object analysis within image data are facial recognition of individuals and license plate recognition, or number plate recognition. Some of these video analytics systems are sophisticated enough to identify a particular person from their facial characteristics, and can identify a particular license plate by reading and recognizing the text and numbers within the license plate, in examples.

SUMMARY OF THE INVENTION

Current video surveillance systems have problems. Video surveillance systems can increase the volume of data traffic sent over the networks. This increased data traffic volume can limit the available bandwidth of the networks, which can cause performance problems for components of the video surveillance systems and other nodes that communicate over the networks.

One reason for the increased data traffic created by current video surveillance systems is that the surveillance cameras typically send their image data over the networks for further processing. For example, the image data are typically sent by surveillance cameras over the network to video analytics systems located within the network. Another reason for the increased data traffic over the networks is that recent advances in video technology have resulted in an increase the resolution of the image data that the surveillance cameras capture and transmit.

Another issue with current video surveillance systems is cost. The video analysis methods employed by video analytics systems for analyzing the image data are typically memory intensive and processor intensive tasks. As a result, this requires that the video analytics systems be high-performance or specialized computer systems. This typically increases the cost of the video analytics systems, which correspondingly increases the cost of the overall video surveillance systems. Moreover, the analysis methods are constantly being improved and so the systems must be periodically updated.

The present invention concerns a model for the processing of the image data by separating the analysis into separate object detection and object analysis functions or systems. The object detection system detects objects of interest and classes of objects of interest within the image data. The object analysis system then analyzes the image data including the detected objects of interest, in one example, to recognize (e.g. identify) the detected objects of interest. This division can be used to lower the volume of image data transmitted over the intervening networks by locating the object detection closer to the cameras and then sending only the "interesting" portions of the image data to the more remote object analysis system.

The object analysis system can analyze the image data using many different analysis methods. For this purpose, the object analysis system typically first accesses information from a database such as reference images, image processing functions, patterns, neural network functions, deep learning functions, and object classification functions.

Then, the object analysis system can analyze the image data by comparing the image data to the reference images to identify the objects of interest within the images, by recognizing patterns in the image data from the patterns, and/or by applying the image processing functions, the neural network functions, the deep learning functions, and/or the object classification functions to the image data, in examples. The image processing functions can include filtering, image/contrast enhancement, compression, and deblurring of the image data, in examples.

In one example, the object detection system is integrated within the surveillance cameras or a gateway system, and the object analysis system is then located in a more remote video analytics system.

As a result, only image data that includes the detected objects of interest needs to be sent over the data network for object analysis by the local or remote video analytics systems. This saves on bandwidth as compared to current video surveillance systems, which typically send all image data including empty scenes and image data not including objects of interest over the data network.

Finally, the object detection system can further limit the image data sent over the data network to achieve even greater bandwidth savings. In one example, the object detection system can create cropped images from the image data that include only the detected objects of interest, and send only the cropped images over the data network for processing by the video analytics system.

In general, according to one aspect, the invention features a video surveillance system that comprises one or more surveillance cameras that capture image data, an object detection system that detects objects of interest within the image data, and a video analytics system that receives the image data, transmitted over a network, from the object detection system The image data received by the video analytics system correspond to objects of interest detected by the object detection system, and the video analytics system then analyzes the objects of interest.

In this way, the object detection is separated from object analysis. Thus, only a portion of the image data generated by the surveillance cameras needs to be sent over the network.

In some embodiments, the object detection system creates cropped images from the image data that include the detected objects of interest and sends the cropped images to the video analytics system to further reduce bandwidth. In other cases, entire frames of image data are provided, also metadata may be included to identify the portion of the frames containing the detected objects.

In some cases, objects of interest detected by the object detection system are ranked by the object detection system according to factors including close proximity of the objects of interest to the one or more surveillance cameras, picture quality of the objects of interest, and/or contrast of the objects of interest.

The video analytics system may include an object analysis system that compares the image data corresponding to objects of interest detected by the object detection system to reference images to identify the objects of interest. At the same time, the object detection system may be integrated within the one or more surveillance cameras.

The video analytics system may be a node on an enterprise network. On the other hand, it could alternatively or additionally be a cloud analytics system.

In some embodiments, a gateway system is included that provides access to the video analytics system over a public network. The object detection system might be integrated within the gateway system. The gateway system can be a node on the local network or integrated within the cameras.

In general, according to one aspect, the invention features a method for analyzing video in a video surveillance system. This method comprises capturing image data from one or more surveillance cameras, detecting objects of interest within the image data via an object detection system. The object detection system transmits the image data over a network, the image data transmitted by the object detection system corresponding to objects of interest detected by the object detection system. Finally, a video analytics system receives the image data from the object detection system and analyzes the objects of interest.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 6 and 7 are diagrams that show exemplary messaging between the major components of the system of FIG. 5, where FIG. 6 shows messaging associated with processing of live image data, and where FIG. 7 shows messaging associated with forensic processing of image data recorded by a network video recorder.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
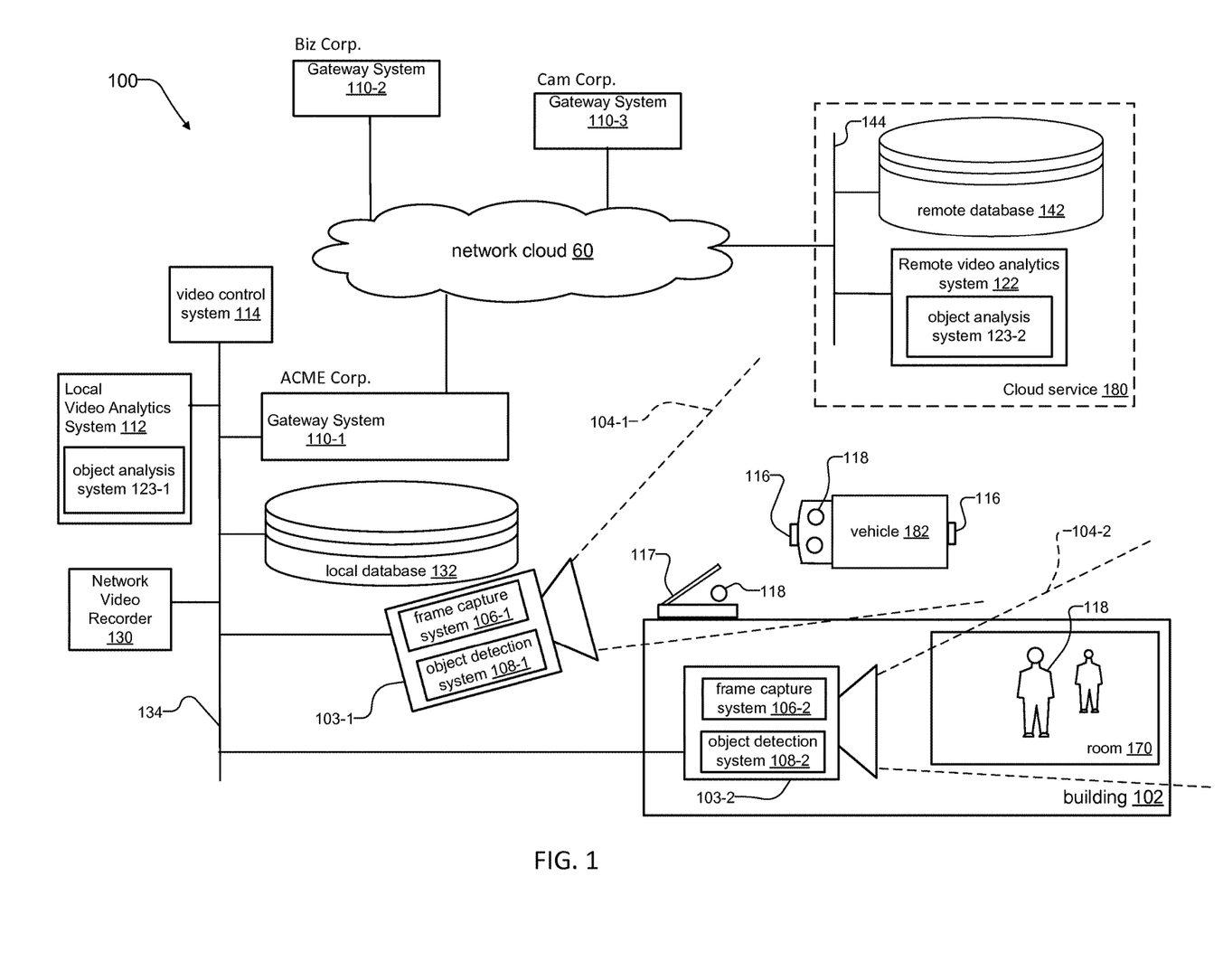
FIG. 1 is a schematic block diagram of an embodiment of a distributed video surveillance system according to the invention.

FIG. 1 shows an embodiment of a distributed video surveillance system 100. The system 100 is deployed within large businesses, large corporate entities, or government entities, in examples. Multiple exemplary businesses Biz Corp. (Biz), Cam Corp. (Cam), and ACME Corp ("ACME") are shown. Detail is included for network 134 of only one (ACME), for clarity, however.

The illustrated system 100 includes a local video analytics system 112 that is a node on the business's enterprise network 134. The local video analytics system 112 enables processing of the image data from the surveillance cameras 103 within the enterprise network 134. In addition, the businesses such as ACME can also use remote video analytics systems 122 hosted by cloud services 180 to analyze the image data from the surveillance cameras 103.

In some implementations, a third-party company operates cloud service 180. The cloud service 180 can also be a public or private cloud service, in different examples. Public clouds differ from private clouds with respect to security and sharing of the resources that they provide to their clients. Public clouds generally share their datacenter resources among multiple clients. In contrast, private clouds typically dedicate specific resources to individual clients.

The cloud service 180 is typically operated by a different business entity than the business entities that operate businesses Cam, Biz, and ACME. The businesses are clients of the cloud service 180. This allows the businesses Cam, Biz, and ACME to leverage the expertise of the cloud service and its ability to provide constant performance updates and improvements.

The cloud service 180 includes components such as a remote database 142 and a remote video analytics system 122. The remote video analytics system 122 includes an object analysis system 123-2. The remote database 142 and the remote video analytics system 122 are nodes of cloud service network 144.

The business clients ACME, Biz, and Cam access the components of the cloud service 180 via their respective gateway systems 110. Each of the gateway systems 110 has a physical or logical interface that connects to an associated enterprise network, such as ACME's enterprise network 134, and an interface that connects to a network cloud 60. The network cloud 60 is preferably a public/service provider network such as the Internet, but can also be a private network built for each specific enterprise client, in examples.

Components of the system 100 that are deployed within ACME are preferably installed as nodes on ACME's enterprise network 134. The components include surveillance cameras 103-1 and 103-2, gateway system 110-1, video control system 114, local video analytics system 112, network video recorder 130, and local database 132. The local video analytics system 112 includes an object analysis system 123-1. Operators of the video surveillance system 100 such as on-site security and surveillance personnel can use the video control system 114 to control the system's components.

The surveillance cameras 103 capture images and/or video of monitored areas, such as a room 170 within a building 102 or premises adjacent to a building 102. The images and/or video, also known as image data, can be formatted or presented in different ways. In examples, the image data can be encoded into different formats such as MPEG4 and H.264, JPEG or left as "raw" composite image data, in examples.

Surveillance camera 103-1 is positioned to capture image data of an area adjacent to building 102. The building 102 has entry/access points 117 such as doors from which employee individuals 118 may enter or leave building 102. Individuals 118 in vehicles 182 such as service personnel and employees drive by the building 102 and park the vehicles 182 in parking lots, in examples. The vehicles 182 include license plates 116. The entry/access points 117 and the vehicles 182 are included within the field of view 104-1 of surveillance camera 103-1. Surveillance camera 103-1 also integrates a frame capture system 106-1 and an object detection system 108-1.

Surveillance camera 103-2 is positioned within building 102. The building 102 includes a room 170 with individuals 118. The room 170 and the individuals 118 are included within the field of view 104-2 of surveillance camera 103-2. Surveillance camera 103-2 also integrates frame capture system 106-2 and object detection system 108-2.

Figure 2:
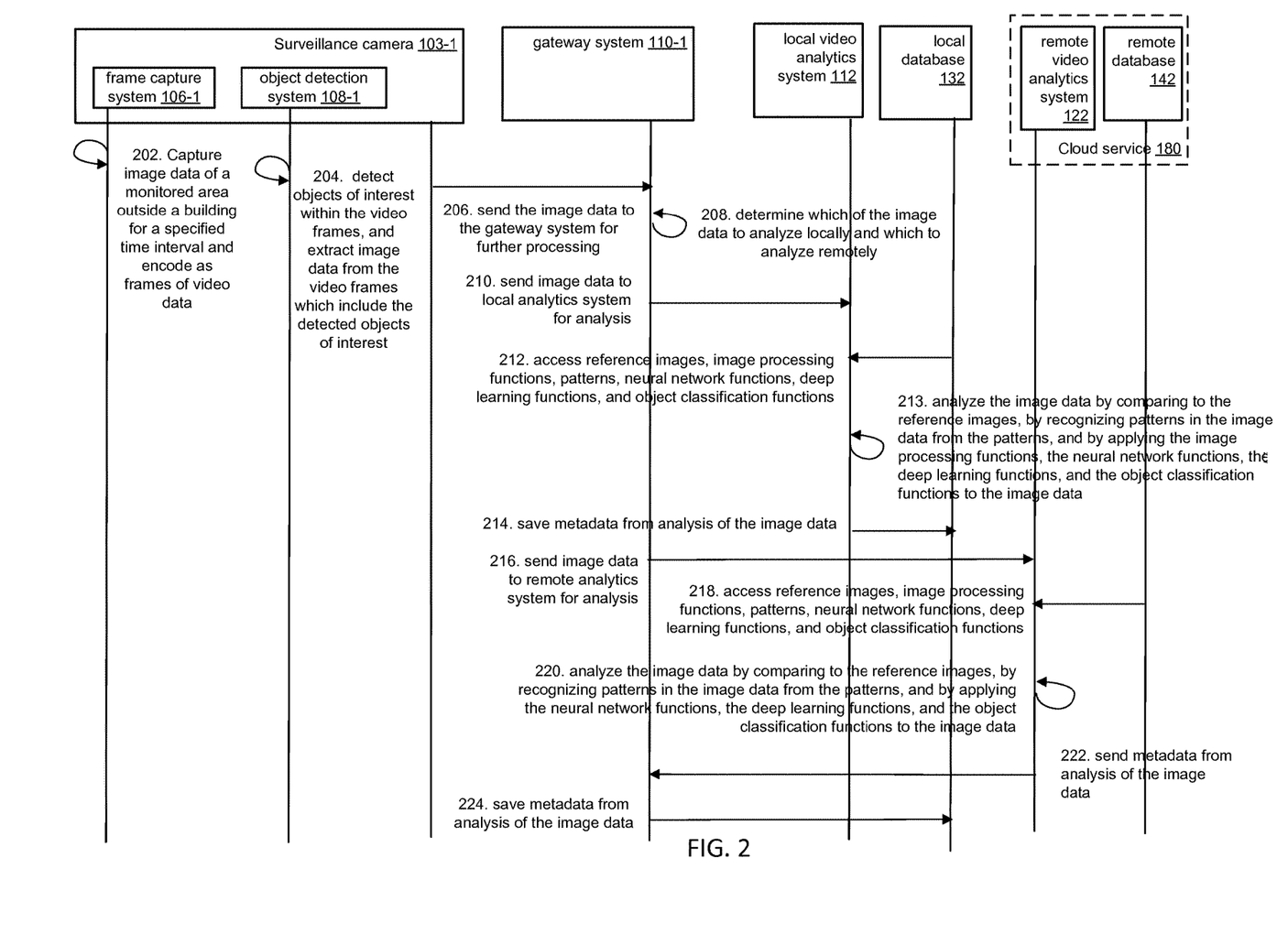
FIG. 2 is a diagram that shows exemplary messaging between the major components of the system of FIG. 1 for processing of image data.

FIG. 2 shows exemplary messaging between major components of the distributed video surveillance system of FIG. 1 associated with "live" processing of image data for large business ACME. The major components include the surveillance camera 103-1, the gateway system 110-1, the local video analytics system 112, the local database 132, and the cloud service 180.

In step 202, the frame capture system 106-1 of the surveillance camera 103-1 captures image data of the monitored area outside the building 102 for a specified time interval. The frame capture system 106-1 then encodes the image data into frames of video data.

In step 204, the object detection system 108-1 detects objects of interest within the frames, and possibly extracts video frames or portions of the framess that include the detected objects of interest. In examples, objects of interest include vehicles 182 and individuals 118, in examples. Of particular interest are the faces of the individuals 118 and license plates 116 of the vehicles 182. In other examples, the objects of interest include animals, retail products or product packaging, smoke, flames, explosives, visible traces of vapors, and atmospheric conditions such as rain, mist, and fog.

In one implementation, the object detection system 108-1 can create cropped images extracted from the frames. The cropped images include the detected objects of interest.

In another example, the object detection system 108-1 may optionally choose to send only some frames that include an indicative pattern or object of interest. Because a face or license plate, or other object class of a detected object of interest may be present in the image for a length of time, typically there will be many frames within the image data that include an object of interest.

The object detection system 108-1 could be also optimized to send a limited number of frames of image data, or even just one frame of image data. This is especially true if the object analysis system 123-1 can sufficiently identify objects from such a limited number of frames.

Further, in some implementations, the object detection system generates and sends metadata along with the image data that includes its identification of a type of the object of interest and/or the location and pixel area of the detected object(s).

Finally, in another example, the object detection system 108-1 can rank the frames or portions of the frames image data corresponding to objects of interest detected by the object detection system 108-1 according to different factors. These factors include close proximity of the objects of interest to the one or more surveillance cameras 103, picture quality of the objects of interest, and/or image contrast of the portion of the image data that contains the objects of interest. The rankings are typically saved in the metadata within or with the image data. Then, the object analysis system 123-1 can read the rankings within the metadata to decide whether or not to analyze the image data.

According to step 206, the object detection system 108-1 then sends the image data, such as cropped or entire images, to the gateway system 110-1 for further processing.

In step 208, the gateway system 110-1 can determine which of the image data to analyze on the local video analytics system 112 and which of the image data to analyze on the remote video analytics system 122, if it is present and available.

In step 210, the gateway system 110-1 can send at least some of the image data over the enterprise network 134 to the local video analytics system 122.

In step 212, the local video analytics system 112 might access reference images, image processing functions, patterns, neural network functions, deep learning functions, and/or object classification functions from the local database 132. Then, in step 212, the local video analytics system 122 analyzes the image data via its object analysis system 123-1.

The local video analytics system 112 analyzes the image data by comparing the image data to the reference images, by recognizing patterns in the image data from the patterns, and/or by applying the image processing functions, the neural network functions, the deep learning functions, and/or the object classification functions to the image data, in examples.

In one specific example, the local video analytics system 112 analyzes the image data by comparing the image data to the reference images to identify the objects of interest within the images. Reference images can include images of current and former employee individuals 118 of ACME, and images of their license plates and/or vehicles, in examples.

In step 214, the local video analytics system 122 saves metadata from analysis of the image data for the identified objects of interest with the image data to the local database 132.

In another specific example, the object detection system 108-1 determines if the image data includes an object of interest, such as a face of an individual 118, and the local or remote video analytics system 112, 122 analyze the image data including the face of the individual 118 to determine the identity of the individual 118.

According to step 216, the gateway system 110-1 can send at least some of the image data over the network cloud 60 to the remote video analytics system 122 for analysis of the image data.

In response to this event, in step 218, the remote video analytics system 122 accesses reference images, image processing functions, patterns, neural network functions, deep learning functions, and/or object classification functions from the remote database 142. Then, in step 220, the remote video analytics system 122 analyzes the image data via its object analysis system 123-2.

Here also, in examples, the remote video analytics system 122 analyzes the image data by comparing the image data to the reference images, by recognizing patterns in the image data from the patterns, and/or by applying the image processing functions, the neural network functions, the deep learning functions, and/or the object classification functions to the image data.

In one specific example, the remote video analytics system 122 analyzes the image data by comparing the image data to the reference images to identify the objects of interest within the images.

Cloud services often provide access to multiple public and subscription-based remote databases 142. These can include government and law enforcement databases that include reference images of known criminals, and images associated with border patrol and surveillance of airports, in examples.

In one example, the object detection system 108-1 determines if the image data includes an object of interest, such as a product on a shelf of a large supermarket, and the remote video analytics system 122 analyzes the image data including the product to determine the type of product, and to determine information about the product within its product label. Reference images taken of the product shelf at different times in the past can provide information for restocking and inventory management, and for marketing and sales purposes to determine how long products remain on shelves, in examples.

In step 222, the remote video analytics system 122 sends metadata for the identified objects of interest over the network cloud 60 to the gateway system 110-1. The gateway system, in step 224, then saves the metadata to the local database 132. In this way, information generated by the cloud system is made available back to the enterprise.

Figure 3:
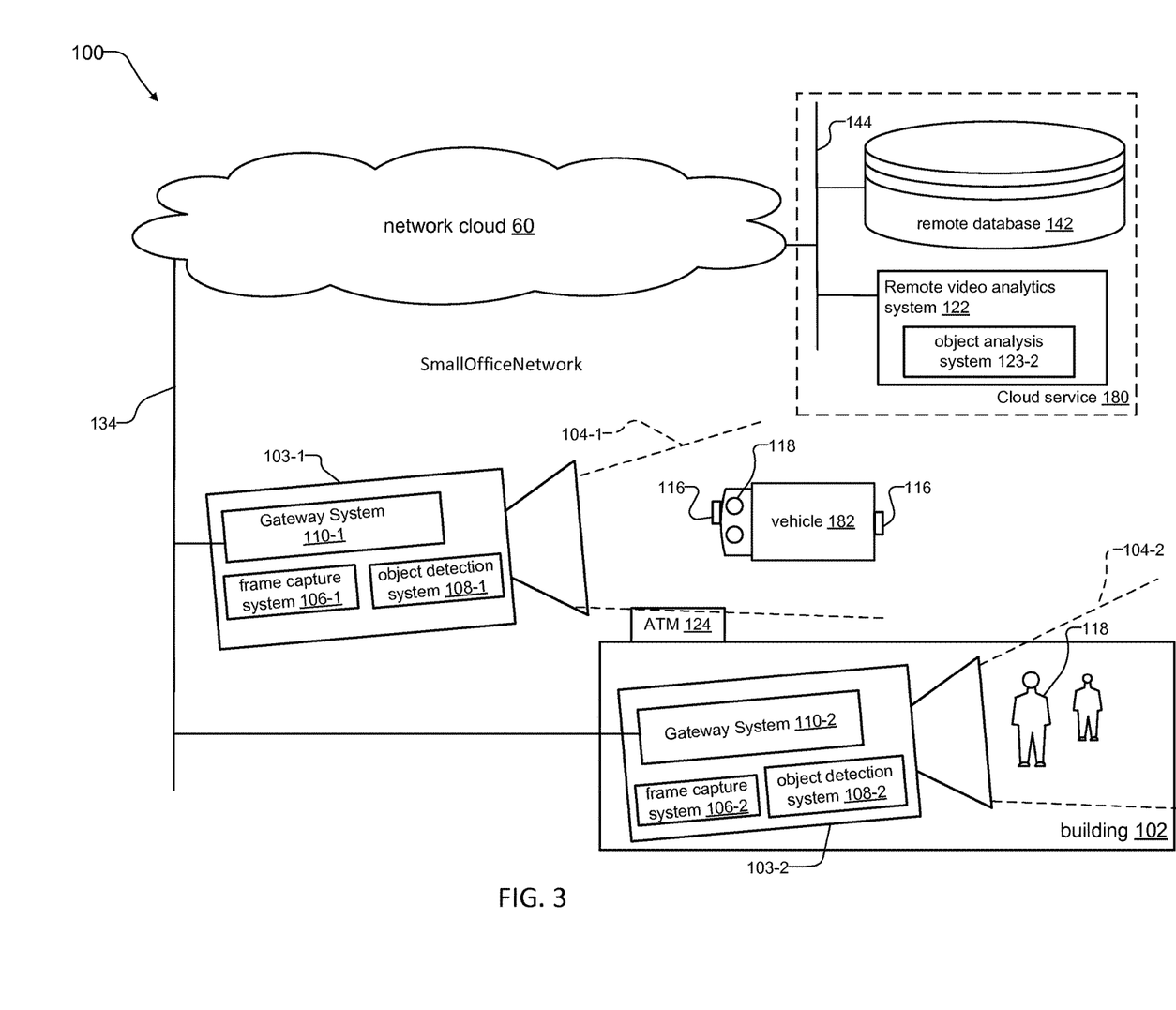
FIG. 3 is a schematic block diagram of a second embodiment of the distributed video surveillance system.

FIG. 3 shows a second embodiment of a distributed video surveillance system 100. The system 100 here might be deployed within a household, small office/home office (SOHO), small retail establishment, or bank branch, in examples. The network 134 is additionally labeled as "SmallOfficeNetwork" to emphasize the nature of the deployment associated with the video surveillance system 100. In examples, the network 134 can be a wireless network, or wired local area network (LAN).

The SOHO typically might not possess the processing capability or could support the cost associated with including a local video analytics systems 112 within the network 134. At the same time, the small office or household typically requires only periodic or occasional access to image data analysis services provided by video analytics systems. As a result, SOHO entities generally use a remote video analytics system 122 hosted by a cloud service 180 to analyze the image data sent from the surveillance cameras 103.

A third-party company typically operates the cloud service 180, which would often be a public cloud in this example The SOHO is a client of the cloud service 180.

The cloud service 180 here also includes components such as the remote database 142 and the remote video analytics system 122. The remote video analytics system 122 includes an object analysis system 123-2. The remote database 142 and the remote video analytics system 122 are nodes of remote network 144.

Components of the system 100 that are deployed within the SOHO are preferably installed as nodes on its network 134. The components include the surveillance cameras 103-1 and 103-2 and the gateway system 110-1. Surveillance camera 103-1 includes the gateway system 110-1, frame capture system 106-1, and object detection system 108-1. Surveillance camera 103-2 includes gateway system 110-2, frame capture system 106-2, and object detection system 108-2.

Surveillance camera 103-1 is positioned to capture image data of an area adjacent to building 102. The building 102 has tenants such as a bank and includes an Automated Teller Machine (ATM) 124 in the illustrated example. Individuals 118 in vehicles 182 access the ATM 124 to perform financial transactions. The vehicles 182 include license plates 116. The ATM 124 and the vehicles 182 are included within the field of view 104-1 of surveillance camera 103-1.

Surveillance camera 103-2 is positioned within building 102. The building 102 includes a room 170 with individuals 118. The room 170 and the individuals 118 are included within the field of view 104-2 of surveillance camera 103-2. Surveillance camera 103-2 also integrates frame capture system 106-2 and object detection system 108-2.

SOHO and small retail establishments typically have limited available bandwidth resources in their networks 134. As in the embodiment of FIG. 1, the surveillance cameras 103 integrate the object detection systems 108 to minimize the amount image data that is sent over the network 134 to the cloud service. Moreover, the gateway system 110 is included within the surveillance cameras 103 to save on cost. Although in other examples, it can be a standalone system that is a node on the local network 134 that aggregate image data from multiple cameras.

Figure 4:
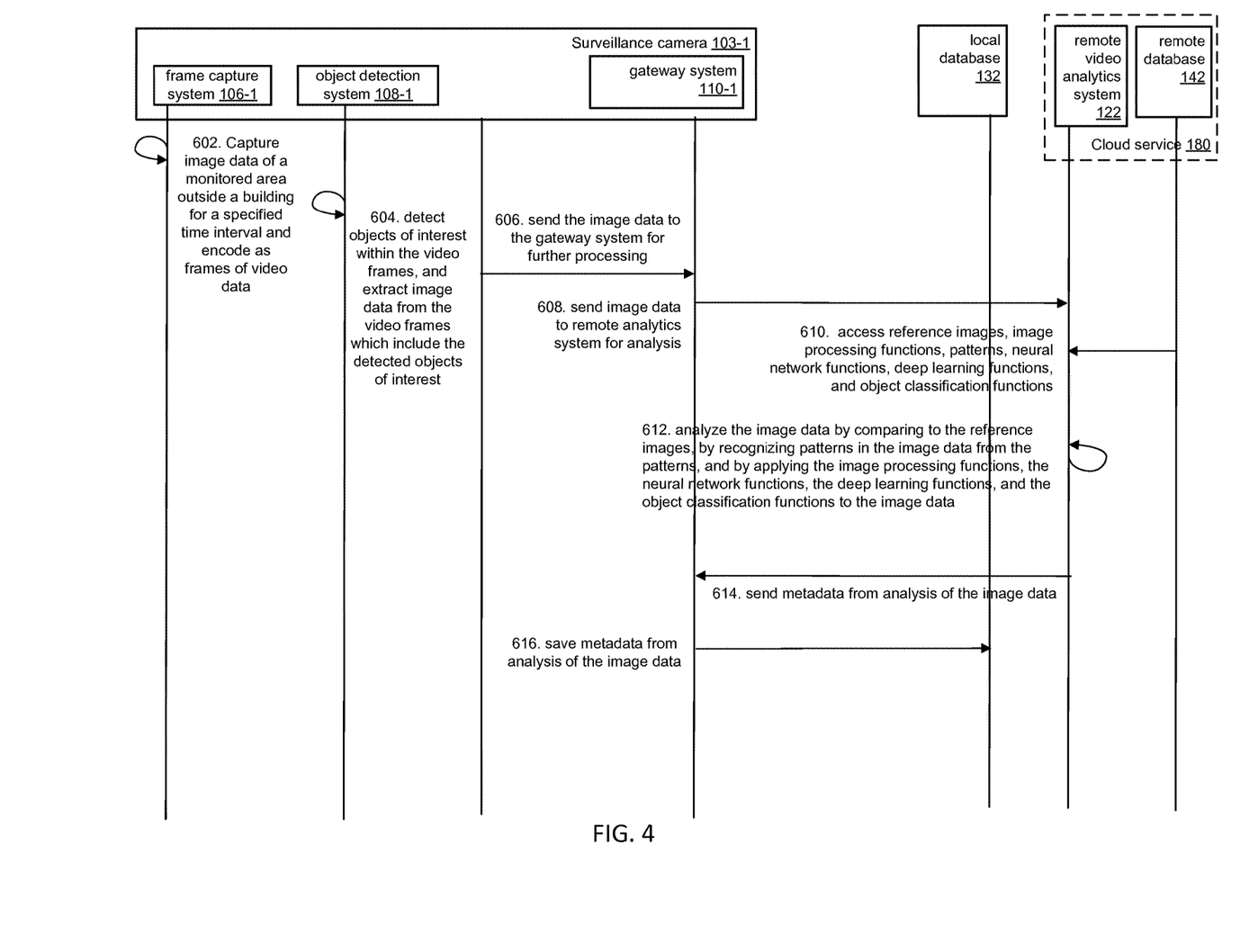
FIG. 4 is a diagram that shows exemplary messaging between the major components of the system of FIG. 3 for processing of image data.

FIG. 4 shows exemplary messaging between major components of the distributed video surveillance system of FIG. 3 associated with "live" processing of image data for a small business, SOHO, or small retail establishment. The major components include surveillance camera 103-1, gateway system 110-1, local database 132, and cloud service 180.

In step 602, the frame capture system 106-1 of the surveillance camera 103-1 captures image data of a monitored area outside a building 102 for a specified time interval. The frame capture system 106-1 then encodes the image.

In step 604, the object detection system 108-1 detects objects of interest within the video frames, and extracts image data from the video frames that include the detected objects of interest. In examples, objects of interest include vehicles 182 and individuals 118.

In one example, the object detection system 108-1 can create cropped frames extracted from the image data. The cropped frames include the detected objects of interest.

According to step 606, the object detection system 108-1 then sends the image data, such as cropped frames or complete frames or image data from a series of frames, to the gateway system 110-1 within the surveillance camera 103-1. Then, in step 608, the gateway system 110-1 sends the image data including the detected objects of interest over the network cloud 60. The image data are sent over the network cloud 60 to the remote video analytics system 122 of the cloud service 180 for processing.

In step 610, the remote video analytics system 122 accesses reference images, image processing functions, patterns, neural network functions, deep learning functions, and object classification functions from the remote database 142.

Then, in step 612, the remote video analytics system 122 analyzes the image data via its object analysis system 123-1. The analysis includes comparing the image data to the reference images, by recognizing patterns in the image data from the patterns, and/or applying the image processing functions, the neural network functions, the deep learning functions, and/or the object classification functions to the image data, in examples.

In one example, the remote video analytics system 122 analyzes the image data by comparing the image data to reference images to identify the objects of interest within the images. The remote system may store metadata and image data for the client in its remote database, or in step 614, the remote video analytics system 122 may send the metadata for the identified objects of interest in the image data to the local gateway system 110-1. Finally, in step 616, the gateway system 110-1 saves the metadata for the identified objects of interest in the image data to a local database.

Figure 5:
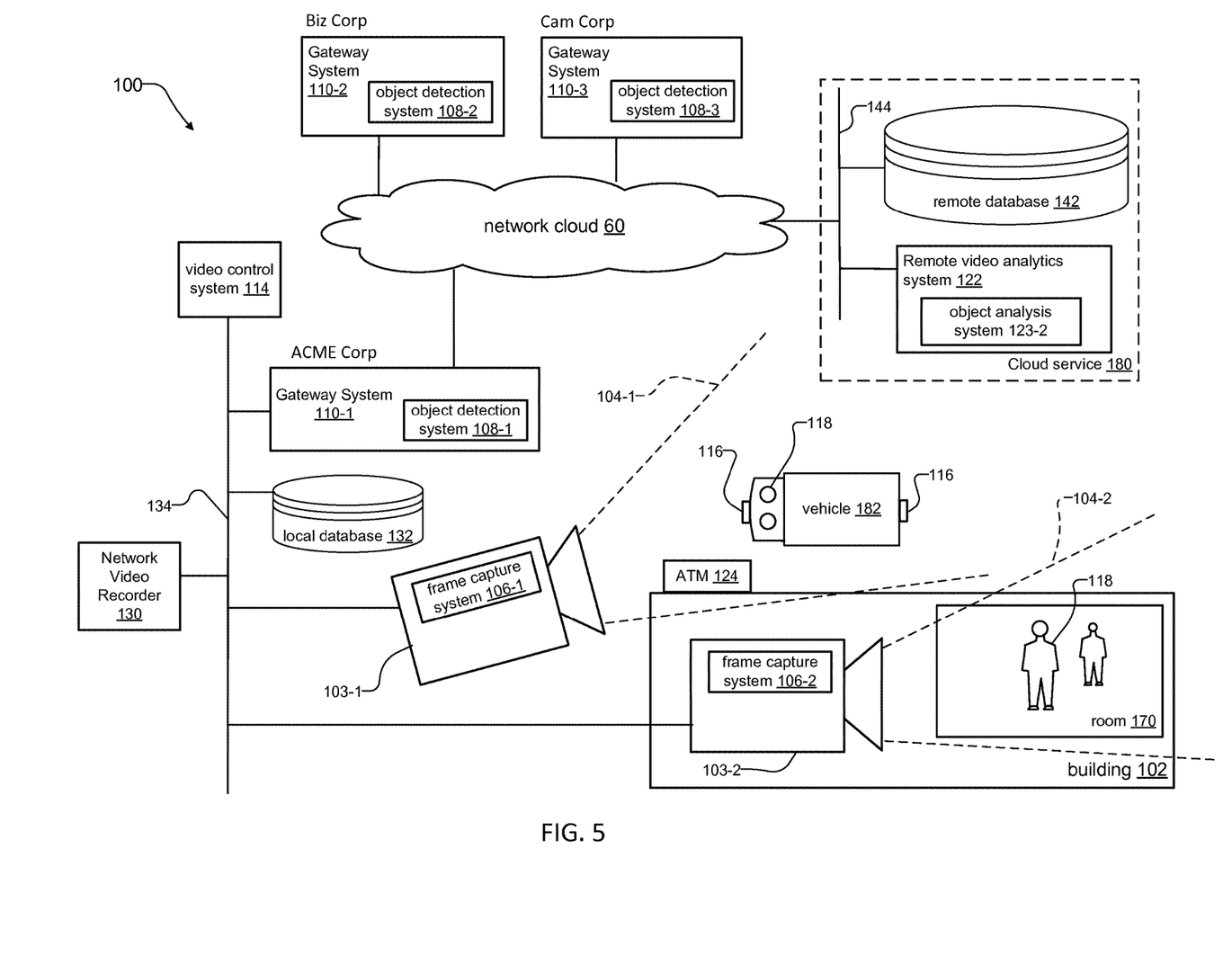
FIG. 5 is a schematic block diagram of a third embodiment of n distributed video surveillance system.

FIG. 5 shows a third embodiment of a distributed video surveillance system 100. The system 100 might be deployed within medium-size businesses and corporate entities, in examples. Multiple exemplary businesses Biz Corp. (Biz), Cam Corp. (Cam), and ACME Corp ("ACME") are shown. Detail is only included for network 134 of ACME, to avoid cluttering the drawing.

In this example, the businesses can require 24-hour access to image data analysis services provided by video analytics systems, but cannot justify the cost of including the local video analysis system 112 as a component within their network 134. As a result, medium size businesses might use a remote video analytics system 122 hosted by a cloud service 180 to analyze the image data from the surveillance cameras 103.

A third-party company operates cloud service 180. The cloud service 180 can be a public or private cloud service, in examples. The cloud service 180 is typically operated by a different business entity than the business entities that operate businesses Cam, Biz, and ACME. The businesses are clients of the cloud service 180.

Here again, the cloud service 180 includes components such as a remote database 142 and a remote video analytics system 122. The remote video analytics system 122 includes an object analysis system 123-2. The remote database 142 and the remote video analytics system 122 are nodes of remote network 144.

The gateway systems 110-1, 110-2, and 110-3 integrate the object detection systems 108-1, 108-2, and 108-3, respectively.

Figure 6:
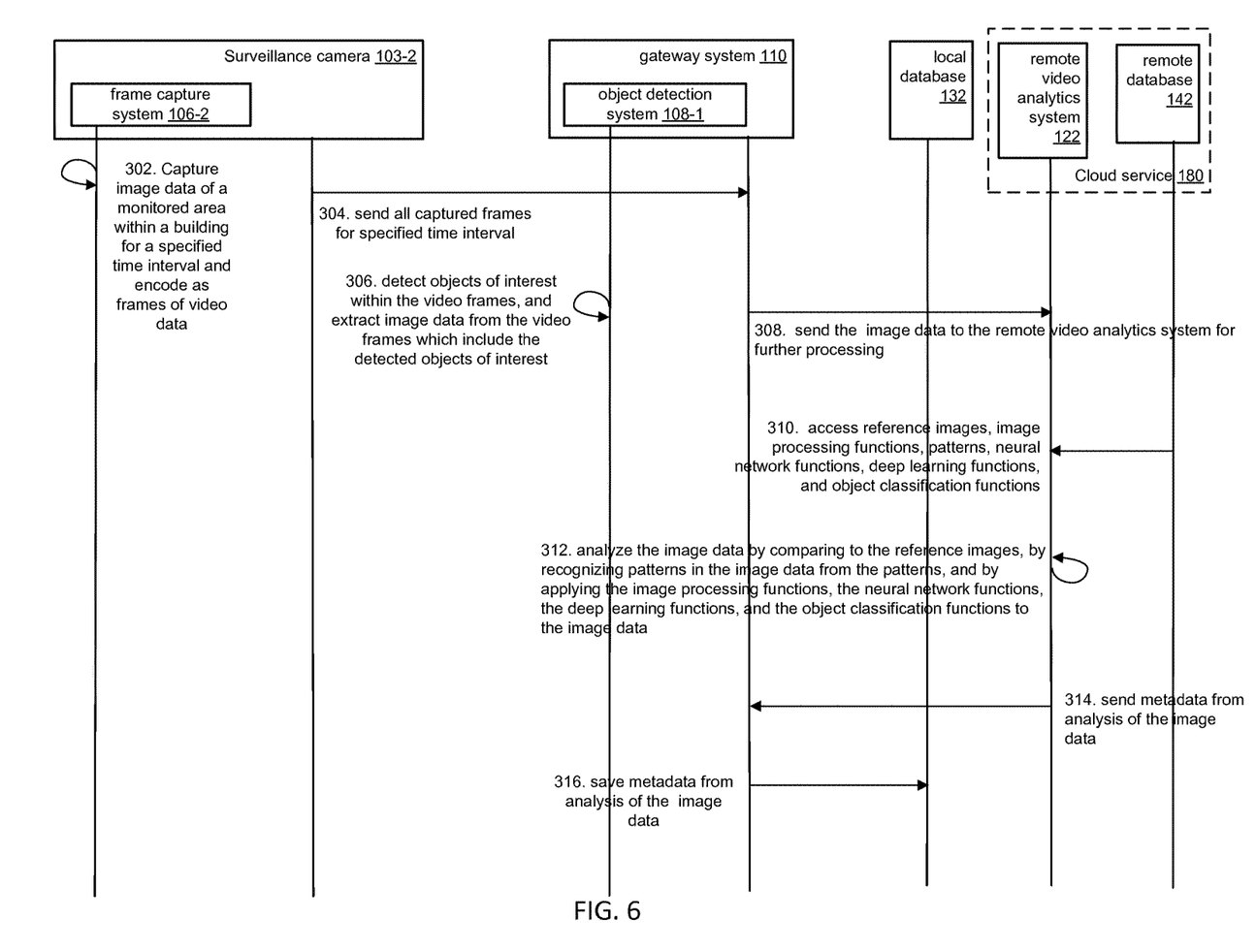

FIG. 6 shows exemplary messaging between major components of the distributed video surveillance system of FIG. 5 associated with "live" processing of image data for a medium-sized business, ACME. The major components include surveillance camera 103-2, gateway system 110-1, local database 132, and cloud service 180.

In step 302, the frame capture system 106-1 of the surveillance camera 103-1 captures image data of a monitored area within a building 102 for a specified time interval. The frame capture system 106-1 then encodes the image data into frames of video data.

In step 304, the surveillance camera 103-2 sends all captured frames for the specified interval to the gateway system 110-1. Then, according to step 306, the object detection system 108 of the gateway system 110 detects objects of interest within the video frames, and extracts image data from the video frames that include the detected objects of interest.

According to step 308, the gateway system 110-1 then sends the image data including the detected objects of interest over the network cloud 60. The image data are sent over the network cloud 60 to the remote video analytics system 122 of the cloud service 180 for processing.

In step 310, the remote video analytics system 122 accesses reference images, image processing functions, patterns, neural network functions, deep learning functions, and/or object classification functions from the remote database 142.

Then, in step 312, the remote video analytics system 122 analyzes the image data via its object analysis system 123-2. The analysis includes comparing to the reference images, recognizing patterns in the image data from the patterns, and/or applying the image processing functions, the neural network functions, the deep learning functions, and/or the object classification functions to the image data, in examples.

In one example, the remote video analytics system 122 analyzes the image data by comparing the image data to reference images to identify the objects of interest within the images. In step 314, the remote video analytics system 122 sends metadata for the identified objects of interest in the image data to the gateway system 110-1. Finally, in step 316, the gateway system 110-1 saves the metadata for the identified objects of interest in the image data to the local database 132.

Figure 7:
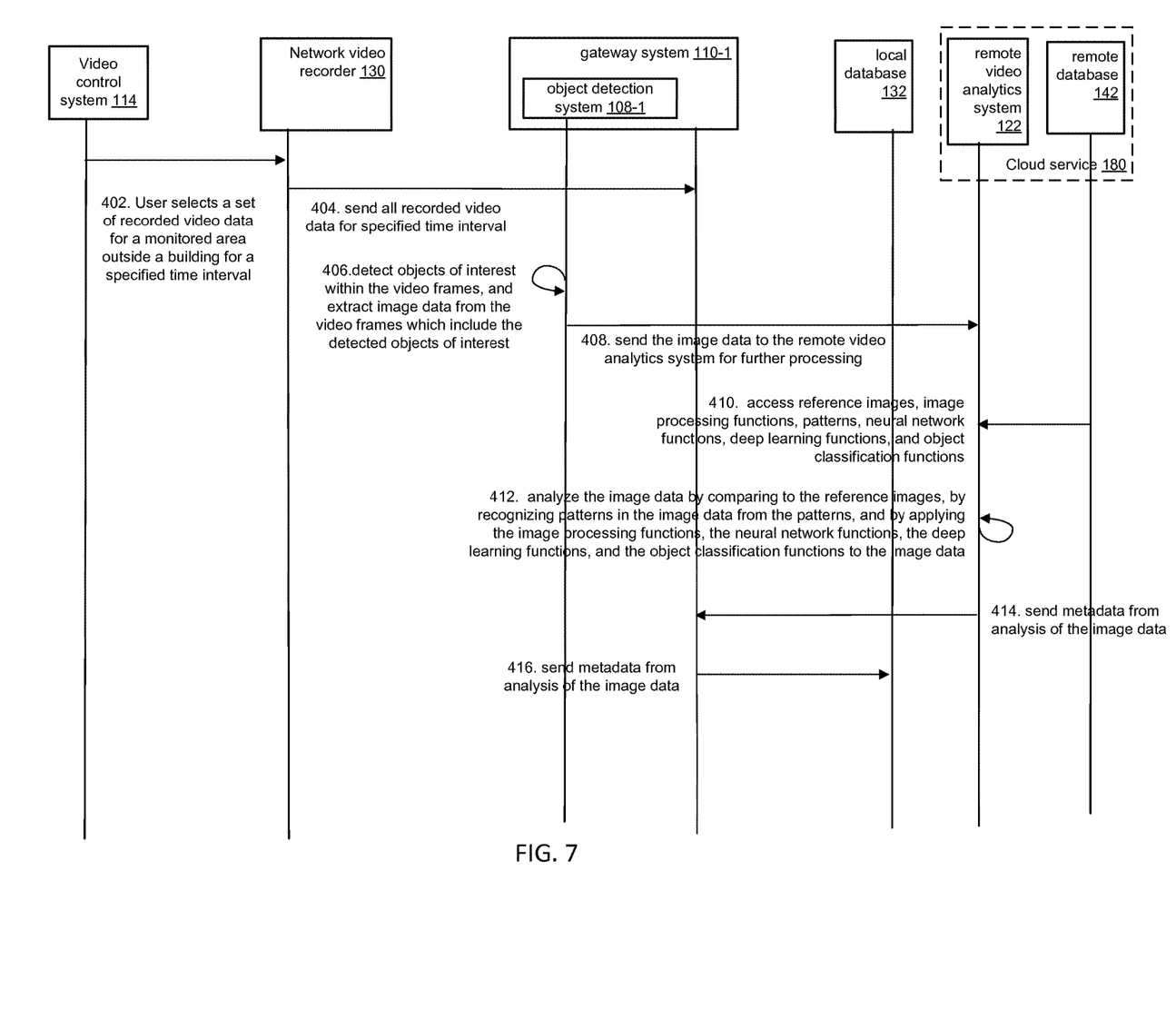

FIG. 7 shows exemplary messaging between major components of the distributed video surveillance system of FIG. 5 associated with forensic processing of image data for a medium-sized business, ACME. The major components include video control system 114, network video recorder 130 camera 103-2, gateway system 110-1, local database 132, and cloud service 180.

In step 402, a user such as a security or surveillance operator accesses the video control system 114 to select a set of recorded video data of a monitored area outside a building 102. The set of recorded video data is associated with a specific time interval selected by the operator. The video control system 114 then requests the selected set of recorded video data from the video recorder 130.

In step 404, the video recorder 130 sends all recorded video data for the specified time interval to the gateway system 110-1.

Then, according to step 406, the object detection system 108 detects objects of interest within the video frames, and extracts image data from the video frames that include the detected objects of interest. In examples, objects of interest include vehicles 182 and individuals 118.

In one example, the object detection system detects objects of interest within the video data by first scanning the pixels, macroblocks, or regions of the video data to detect patterns indicative of the object class to be recognized. For facial detection, the pattern may be eyes, nose and mouth features arrayed in a particular orientation. For license plate detection, the pattern may be a rectangular area including alphanumeric features.

According to step 408, the gateway system 110-1 then sends the image data including the detected objects of interest over the network cloud 60. The image data are sent over the network cloud 60 to the remote video analytics system 122 of the cloud service 180 for processing.

In step 410, the remote video analytics system 122 accesses reference images, image processing functions, patterns, neural network functions, deep learning functions, and/or object classification functions from the remote database 142.

Then in step 412, the remote video analytics system 122 analyzes the image data via its object analysis system 123-2. The analysis includes comparing to the reference images, recognizing patterns in the image data from the patterns, and/or applying the image processing functions, the neural network functions, the deep learning functions, and/or the object classification functions to the image data, in examples.

In one example, the remote video analytics system 122 analyzes the image data by comparing the image data to reference images to identify the objects of interest within the images. In step 414, the remote video analytics system 122 sends metadata for the identified objects of interest in the image data to the gateway system 110-1. Finally, in step 316, the gateway system 110-1 saves the metadata for the identified objects of interest in the image data to the local database 132.

While this invention has been particularly shown and described with references to preferred embodiments thereof, it will be understood by those skilled in the art that various changes in form and details may be made therein without departing from the scope of the invention encompassed by the appended claims.

What is claimed is:

1. A video surveillance system, comprising:
   one or more surveillance cameras that capture image data;
   an object detection system that detects objects of interest within the image data and extracts portions of frames that include the detected objects of interest and sends the extracted portions of the frames; and
   a video analytics system that receives only the extracted portions of the frames of the image data, transmitted over a network, from the object detection system, the image data received by the video analytics system corresponding to objects of interest detected by the object detection system, the video analytics system analyzing the objects of interest;
   wherein the video analytics system receives the image data from multiple object detection systems after being transmitted over the network and the video analytics system is operated by a different business entity than the one or more surveillance cameras; and
   wherein the image data corresponding to objects of interest detected by the object detection system are ranked by the object detection system according to factors including close proximity of the objects of interest to the one or more surveillance cameras, picture quality of the objects of interest, and/or contrast of the objects of interest to create a ranking and the ranking is saved in metadata with the image data and an object analysis system of the video analytics system reads the rankings within the metadata and decides whether or not to analyze the image data.

2. The system of claim 1, wherein the object detection system creates cropped images from the image data that include the detected objects of interest and sends the cropped images to the video analytics system.

3. The system of claim 1, wherein the image data include video data and the object detection system provides frames from the video data that include the detected objects of interest and sends the frames to the video analytics system as the image data.

4. The system of claim 1, wherein the video analytics system includes an object analysis system that analyzes the image data corresponding to objects of interest detected by the object detection system by comparing the image data to reference images to identify the objects of interest, by recognizing patterns in the image data, and/or by applying image processing functions, neural network functions, deep learning functions, and/or object classification functions to the image data.

5. The system of claim 1, wherein the object detection system is integrated within the one or more surveillance cameras.

6. The system of claim 1, wherein the image data corresponding to objects of interest detected by the object detection system are compared by the video analytics system to reference images to identify the objects of interest.

7. The system of claim 6, further comprising a database that receives metadata associated with the identified objects of interest from the video analytics system.

8. The system of claim 1, further comprising a gateway system that provides access to the video analytics system over a public network.

9. The system of claim 8, wherein the object detection system is integrated within the gateway system.

10. The system of claim 1, wherein the one or more surveillance cameras each include a gateway system that provides access to the video analytics system over a public network.

11. The system of claim 1, wherein the video analytics system receives the image data from the object detection system after being transmitted over an enterprise network.

12. The system of claim 1, wherein the video analytics system receives the image data from the object detection system after being transmitted over a cloud network.

13. A method for analyzing video in a video surveillance system, the method comprising:
   capturing image data from one or more surveillance cameras;
   detecting objects of interest within the image data via an object detection system;
   the object detection system extracting portions of frames that include the detected objects of interest and transmitting the extracted portions of the frames of the image data over a network, the image data transmitted by the object detection system corresponding to objects of interest detected by the object detection system; and
   a video analytics system, which is operated by a different business entity than the one or more surveillance cameras, only receiving the extracted portions of the frames of the image data from the object detection system and analyzing the objects of interest;
   the video analytics system further receiving image data from other object detection systems;

the object detection system ranking the image data corresponding to objects of interest detected by the object detection system according to factors including close proximity of the objects of interest to the one or more surveillance cameras, picture quality of the objects of interest, and/or contrast of the objects of interest to create a ranking and the ranking is saved in metadata with the image data; and an object analysis system of the video analytics system reading the rankings within the metadata and deciding whether or not to analyze the image data.

14. The method of claim 13, further comprising the object detection system creating cropped images from the image data that include the detected objects of interest and sending the cropped images to the video analytics system.

15. The method of claim 13, further comprising the image data including video data and the object detection system providing frames from the video data that include the detected objects of interest and sending the frames to the video analytics system as the image data.

16. The method of claim 13, wherein the video analytics system analyzing the image data corresponding to objects of interest detected by the object detection system comprises comparing the image data to reference images to identify the objects of interest, by recognizing patterns in the image data, and/or by applying image processing functions, neural network functions, deep learning functions, and/or object classification functions to the image data.

17. The method of claim 16, further comprising receiving metadata associated with the identified objects of interest from the video analytics system.

18. The method of claim 13, further comprising integrating the object detection system within the one or more surveillance cameras.

19. The method of claim 13, further comprising providing access to the video analytics system over a public network via a gateway system.

20. The method of claim 19, further comprising integrating the object detection system within the gateway system.

21. The method of claim 13, further comprising the one or more surveillance cameras each including a gateway system that provides access to the video analytics system over a public network.

22. A video surveillance system, comprising:

one or more surveillance cameras that capture image data, each having an object detection system that detects faces of individuals and license plates of vehicles within the image data and creates cropped images from the image data that include the detected faces of individuals and license plates of vehicles and send the cropped images from the image data; and a video analytics system that receives the cropped images generated by the object detection systems of the surveillance cameras, transmitted over a network, the video analytics system analyzing the faces of individuals and license plates of vehicles in the cropped images by identifying the faces of the individuals from reference images, recognizing patterns in the image data, and by applying object classification functions to the image data;

wherein the video analytics system is operated by a different business entity than the one or more surveillance cameras; and wherein the image data corresponding to objects of interest detected by the object detection system are ranked by the object detection system according to factors including close proximity of the objects of interest to the one or more surveillance cameras, picture quality of the objects of interest, and/or contrast of the objects of interest to create a ranking and the ranking is saved in metadata with the image data and an object analysis system of the video analytics system reads the rankings within the metadata and decides whether or not to analyze the image data.

23. The system of claim 22, the object detection system of the surveillance cameras determines if the image data includes a product on a shelf of a large supermarket, and the video analytics system determines a type of product and provides information for restocking and inventory management, and for marketing and sales purposes to determine how long the products remain on the shelf.

* * * * *